United States Patent
Desai et al.

(10) Patent No.: US 10,747,743 B2
(45) Date of Patent: Aug. 18, 2020

(54) ON-DEMAND DATABASE CATALOG UPGRADE

(71) Applicant: International Business Machines Corporation, Armonk, NY (US)

(72) Inventors: Samar T. Desai, Pune (IN); Dattatreya Govindappanavar, Hirekerur (IN); Prashant N. Kapse, Pune (IN)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 15/197,856

(22) Filed: Jun. 30, 2016

(65) Prior Publication Data

US 2018/0004792 A1     Jan. 4, 2018

(51) Int. Cl.
*G06F 16/23* (2019.01)
*G06F 16/21* (2019.01)
*G06F 16/25* (2019.01)

(52) U.S. Cl.
CPC .......... *G06F 16/2336* (2019.01); *G06F 16/21* (2019.01); *G06F 16/219* (2019.01); *G06F 16/252* (2019.01)

(58) Field of Classification Search
CPC ......... G06F 17/30359; G06F 17/30289; G06F 17/3056; G06F 16/219; G06F 16/2336; G06F 16/252; G06F 16/21
USPC ......................................................... 707/738
See application file for complete search history.

(56) References Cited

U.S. PATENT DOCUMENTS

| | | | | |
|---|---|---|---|---|
| 5,924,096 | A * | 7/1999 | Draper | G06F 16/27 |
| 6,341,288 | B1 * | 1/2002 | Yach | G06F 16/284 |
| 7,571,173 | B2 * | 8/2009 | Yang | G06F 16/258 |
| | | | | 707/802 |
| 7,809,763 | B2 * | 10/2010 | Nori | G06F 16/213 |
| | | | | 707/802 |
| 8,244,699 | B2 * | 8/2012 | Bolohan | G06F 16/213 |
| | | | | 707/695 |
| 8,924,384 | B2 | 12/2014 | Driesen et al. | |
| 9,122,716 | B1 | 9/2015 | Naganathan et al. | |
| 2008/0027642 | A1 * | 1/2008 | Winberry | G06F 16/29 |
| | | | | 701/455 |
| 2008/0208888 | A1 * | 8/2008 | Mitchell | G06F 16/2477 |
| 2012/0101983 | A1 | 4/2012 | Hopmann et al. | |
| 2013/0138695 | A1 * | 5/2013 | Stanev | G06F 16/219 |
| | | | | 707/792 |
| 2013/0238577 | A1 | 9/2013 | Driesen et al. | |
| 2015/0161182 | A1 | 6/2015 | Baeuerle et al. | |
| 2015/0193630 | A1 * | 7/2015 | Von Kaenel | G06Q 40/08 |
| | | | | 707/785 |
| 2016/0085777 | A1 | 3/2016 | Engelko et al. | |

OTHER PUBLICATIONS

"Migrating from enabling-new-function mode to new-function mode", IBM Knowledge Center, Printed Mar. 11, 2016, 1 page, <https://www.ibm.com/support/knowledgecenter/SSEPEK_11.0.0/com.ibm.db2z11.doc.inst/src/tpc/db2z_convertenfm2nfm.html>.

(Continued)

Primary Examiner — Shahid A Alam
(74) Attorney, Agent, or Firm — Joseph P. Curcuru

(57) ABSTRACT

Upgrading a database while the database is accessible to applications. Specifically, the database upgrade is performed selectively as per demand from system catalog tables. With this on-demand technique, the upgrade of a database is run on a need basis to upgrade, over time, all the catalog objects.

20 Claims, 5 Drawing Sheets

450

(56) References Cited

OTHER PUBLICATIONS

Appendix P List of IBM Patents or Publications Treated as Related. Dated Sep. 27, 2017. Two pages.
Desai et al. Original U.S. Appl. No. 15/712,281, filed Sep. 22, 2017.

* cited by examiner

ON-DEMAND DATABASE CATALOG UPGRADE

BACKGROUND

The present invention relates generally to the field of database management, and more particularly to database upgrades.

In database systems, a database refers to a collection of data that may include schemas, tables, queries, reports, views and other objects. The data are generally organized such that the data are able to be easily accessed, managed, and updated. A database catalog of a database instance consists of metadata in which definitions of database objects such as base tables, views (virtual tables), synonyms, value ranges, indexes, users, and user groups are stored.

Among many operations of databases, an upgrade is an important database operation to keep a database up-to-date. As part of database upgrade, database catalog objects need to be updated. Modifications of database catalog objects generally include: (i) addition of one or multiple new system catalog tables; (ii) addition of new columns in existing system catalog tables; (iii) removal of some columns from existing system catalog tables; and/or (iv) altering column definitions of existing system catalog tables.

SUMMARY

In one aspect of the present invention, a method, a computer program product, and a system, includes: performing a selective upgrade of a database instance from a first version of a database to a second version of the database, wherein the selective upgrade modifies the database instance to refer to the second version of the database, and the selective upgrade does not modify, in the database instance, at least one catalog object of the second version; receiving a request from an application to access the at least one catalog object; identifying a set of rows in the catalog object, the set of rows matching requirements of the request; and modifying the set of rows to match a corresponding set of rows of the second version of the database.

DETAILED DESCRIPTION

Figure 1:
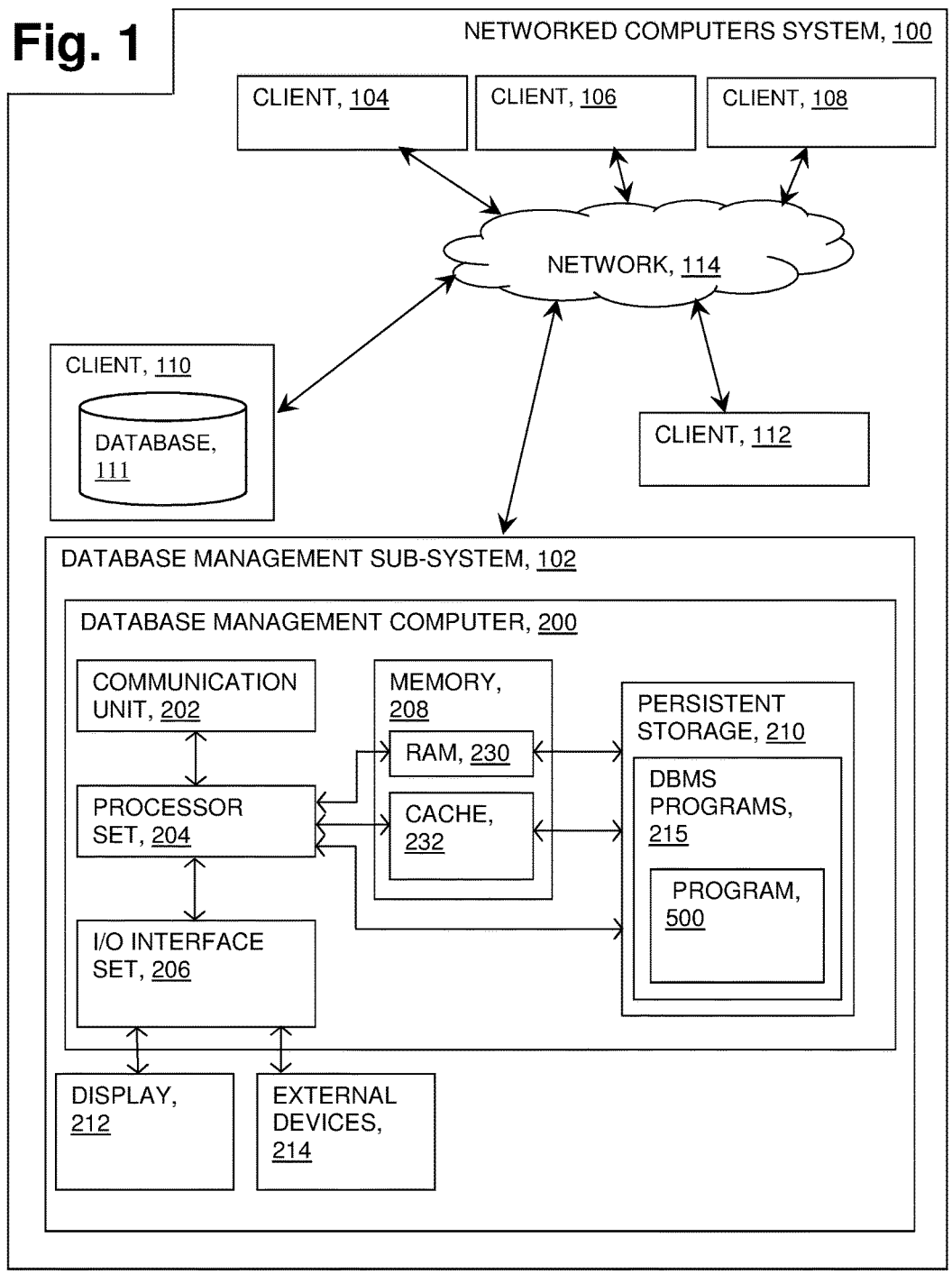
FIG. 1 is a schematic view of a first embodiment of a system according to the present invention.

A method is provided to address non-availability of a database engine during the database upgrade process. Performing an online upgrade of the database is enabled when the database is up and running in a latest server version and transparent to users. Further the downtime of the database is avoided. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: database management (DBM) sub-system 102; client sub-systems 104, 106, 108, 110, 112; database 111; communication network 114; database management computer 200; communication unit 202; processor set 204; input/output (I/O) interface set 206; memory device 208; persistent storage device 210; display device 212; external device set 214; database management system (DBMS) programs 215; random access memory (RAM) devices 230; cache memory device 232; and program 500.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 500 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 500 is stored in persistent storage 210 for access and/or execution by one or more of the respective computer processors 204, usually through one or more memories of memory 208. Program 500 is located within DBMS programs 215, where other programs (not shown) carry out various functions of database management. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 500 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 500, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Database 111 is an organized collection of data. The data is typically organized to model aspects of reality in a way that supports processes requiring information. For example, modelling the availability of rooms in hotels in a way that supports finding a hotel with vacancies.

Program 500 operates to perform a full database catalog upgrade on-demand as needed and/or when needed on a per row basis, which eliminates the perceived downtime for the database such that the database remains highly available to applications during the database catalog upgrade time. Downtime, as used herein refers to a time period during which the database is not available for use or access. In some embodiments, perceived downtime refers to a degree of availability, such that the user detects a sluggish or lagging interaction with the database.

Some embodiments of the present invention recognize the following facts, potential problems and/or potential areas for improvement with respect to the current state of the art: (i) database upgrade from a low level major version to a high level major version may constitute a major portion of the offline window when the database engine is not accessible to other applications while database upgrade is in progress; (ii) conventionally, access to a database is limited while the database upgrade occurs; and/or (iii) for some conventional technology, two different host systems are needed for performing database upgrade: one system for the current version of database engine software and hardware, and another system for the upgrading version of database engine software and hardware.

Database upgrades are relatively high cost operations for users because the users have to experience the downtime interval of the database until the database completes upgrades to a latest version from a lower version. The downtime may last for hours depending on the number of database catalog objects. Considering production databases of a size in a range of terabytes having millions of catalog objects in the database, the downtime would be significant, which affects the productivity of the users.

Generally speaking, database upgrades do not affect the data pages of a database. Metadata of the database (for example, catalog objects within the database) generally needs to be updated as part of database upgrade. For example, as part of new feature enhancement in the database products, there are additions in the system catalog objects of a database. The modifications in the system catalog objects may be, for example, addition and/or removal of one or more columns from existing system catalog tables. Such upgrades need to be handled by the database engine whenever the database is upgraded from a low level version to a high level version. This constitutes a major portion of the offline window (e.g., the downtime) when the database engine is not accessible to other applications while database upgrade is in progress. A database engine used herein refers to the underlying software component that a database management system (DBMS) uses to create, read, update and/or delete data from a database. The database catalog of a database instance comprises metadata in which definitions of database objects such as base tables, views (virtual tables), synonyms, value ranges, indexes, users, and user groups are stored. A database instance, as used herein, refers to the processes and memory structures of the running database engine.

Figure 2:
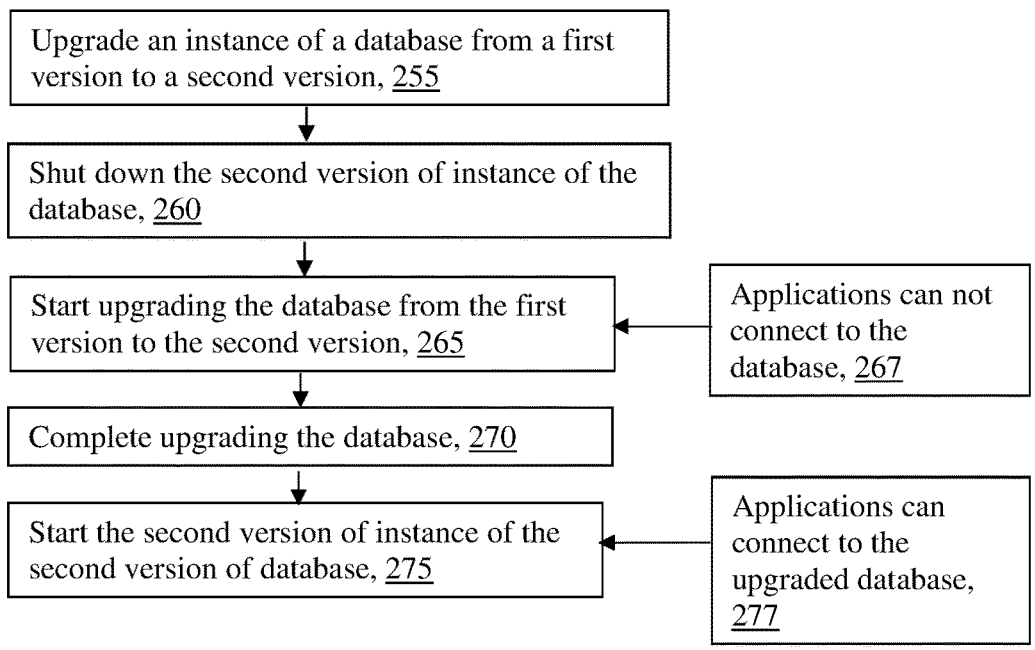
FIG. 2 is a diagram for a conventional method of upgrading a database.

For example, as shown in FIG. 2 that depicts one conventional way to upgrade a database, the database is not accessible to applications during the upgrade. Specifically, a database instance is upgraded first from a first version to a second version (255). The database instance of the second version is then shut down (260). The core database upgrade is started by, for example, issuing a command "upgrade database" (265). This upgrade runs a conversion process of all the underlying catalog tables in a super exclusive connection mode, thus, no other applications can connect to this database till the time when the upgrade of database is finished successfully (270) and the second version of the instance of the upgraded database is back to run (275 and 277). As seen from the above process, a downtime occurs for all applications that do real work with this database. Thus, applications are not able to connect to the database during complete upgrade process.

Some embodiments of the present invention provide a method of selective database upgrade. In such embodiments, the instance upgrade of database is performed first. No separate upgrade database command is required for upgrade the database. The upgrade of the database occurs selectively, which means that applications can stay connecting to the database while the database upgrade is in the process. This eliminates the perceived downtime for the database and database remains highly available even during database upgrade time.

Figure 3:
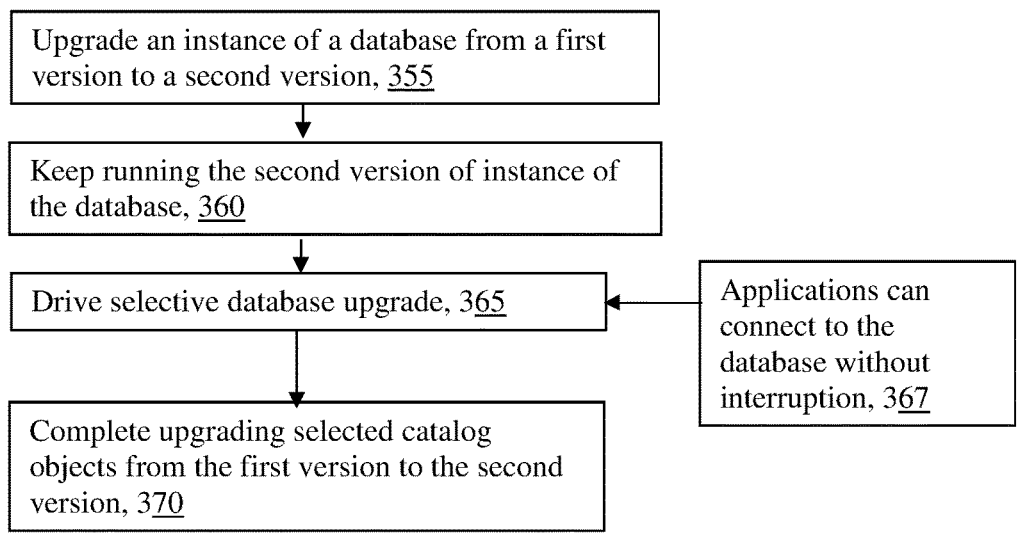
FIG. 3 is a diagram for a first method of upgrading a database according to one embodiment of the present invention.

For example, as shown in FIG. 3, a method diagram according to one embodiment of the present invention illustrates a database instance upgraded first from a first version to a second version (355). The database instance of the second version is kept running (360) (i.e., the instance is not shut down for the next upgrade of the database). The core database upgrade is selectively started by the database engine (365). For example, by responding to a query to one or more rows in a table, the database engine drives an implicit catalog row conversion module which makes the specific one or more rows compatible to the second version and update their versions to the second version. The upgrade of the database is thus run on a need-basis rather than the conventional brute force technique to upgrade all the catalog objects as shown in FIG. 2. Accordingly, other applications can connect to this database while the upgrade of database is performed (367). With such on-demand technique, the entire catalog objects of the database are able to be upgraded gradually and completely from the first version to the second version (370).

Figure 4:
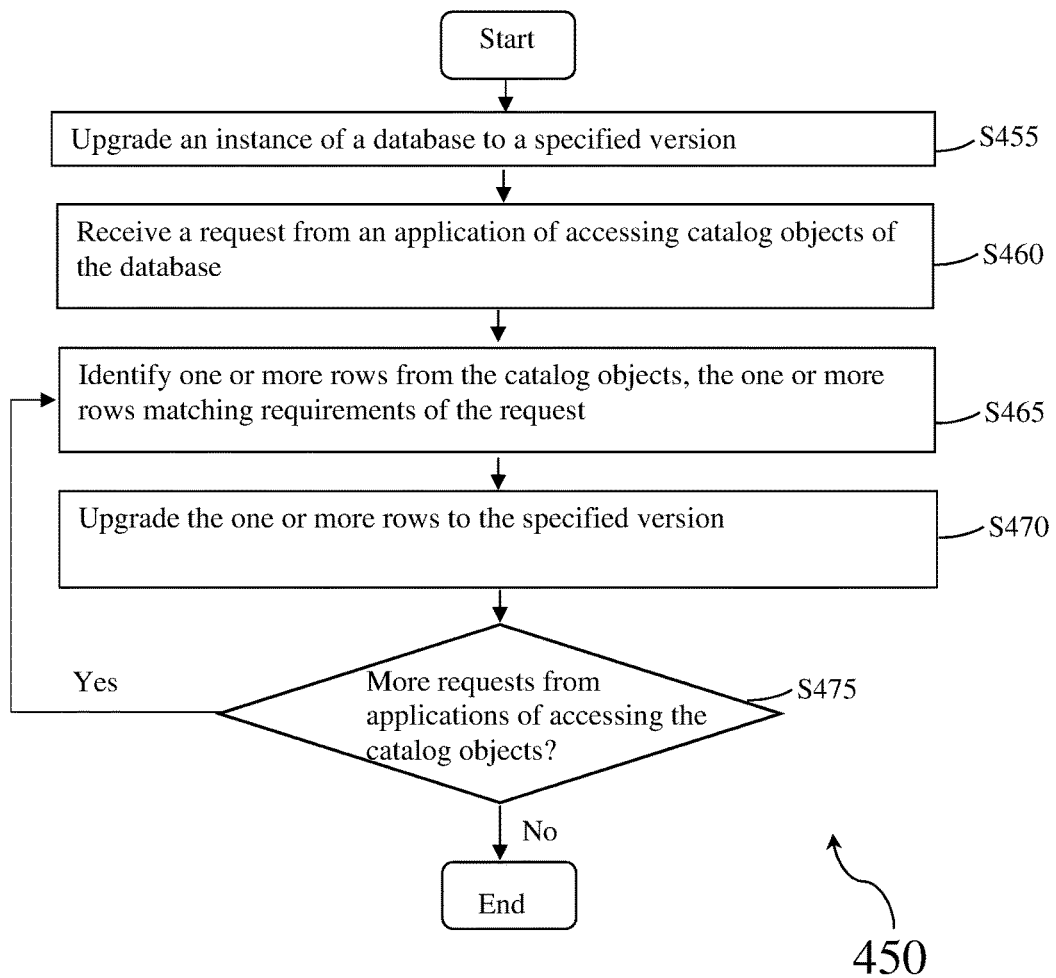
FIG. 4 is a flowchart depicting an embodiment of a second method that may be performed, at least in part, by the system depicted in FIG. 1.
Figure 5:
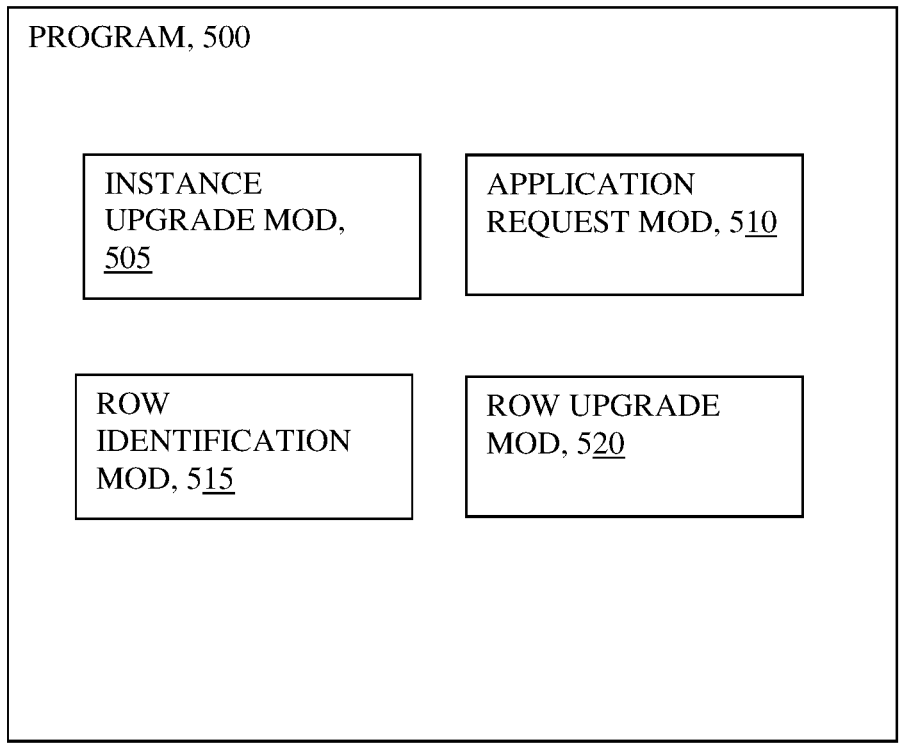
FIG. 5 is a schematic view of a machine logic (for example, software) portion of the system depicted in FIG. 1.

FIG. 4 shows flowchart 450 depicting a second method according to the present invention. FIG. 5 shows program 500 for performing at least some of the method steps of flowchart 450. This method and associated software will now be discussed, over the course of the following paragraphs, with extensive reference to FIG. 4 (for the method step blocks) and FIG. 5 (for the software blocks).

Processing begins at step S455, where instance upgrade module ("mod") 505 upgrade an instance of a database to a specified version. In this example, an instance of database 111 in FIG. 1 is upgraded from a lower version to a higher version, for example from a version Vn to a version Vn+1. But the metadata (e.g., catalog objects) of the database are still at version Vn. A database instance, as used herein, refers to the processes and memory structures of the running database engine.

Processing proceeds to step S460, where application request module 510 receives a request from an application to access catalog objects of the database. In this example, an application on one of clients 104, 106, 108, 110 and 112 connects to the database. As stated in step S455, the instance has been upgraded to Vn+1 from Vn, but its metadata is still at version Vn. The application may need to access different catalog objects to fulfill the request. One simple example of the request is a select query to request all records from a table T. Table A shows an example of a catalog table.

TABLE A an example of a catalog table.

| Creator | Name | Packed_Desc |
|---------|----------|-------------|
| Jerry | Sales | <blob> |
| Jerry | Products | <blob> |
| Tom | Employee | <blob> |
| Tom | Client | <blob> |

A corresponding definition of the catalog table of Table A is as follows:

```
Struct Packed_Desc
{
    Char creator [128];
    Char name [128];
    Sint 16 flags;
}
```

In the catalog table definition above, a packed descriptor is a column within the catalog tables that is used to identify the details of a database object. Packed descriptors logically represent the row, though they may have some internal information that need not be externalized (e.g. "flags" in this example). Further in this catalog table, materialized query tables (MQTs) are supported, but the database engine distinguishes tables from MQTs, so there is no need to distinguish between tables and MQTs in the catalog table.

Processing proceeds to step S465, where row identification module 515 identifies one or more rows from the catalog objects. The one or more rows matches requirements of the request. In this example, as part of the metadata of the database, the catalog tables are still at an older definition as Vn, because the catalog tables scope is per database and not instance based. The database engine read a row for the table T from catalog tables. The rows corresponding to this table T in the catalog tables are at Vn as can be read from catalog table's versioning column. Table B shows an example of a catalog table and a corresponding definition of the catalog table where one row is identified (the last row in italics).

TABLE B an example of a catalog table with one row identified (shown in italics).

| Creator | Name | Type | Packed_Desc |
|---------|-----------|------|-------------|
| Jerry | Sales | T | <blob> |
| Jerry | Products | T | <blob> |
| Tom | Employee | T | <blob> |
| Tom | Client | T | <blob> |
| Jerry | Inventory | T | <blob> |
| *Tom* | *managers* | *V* | *<blob>* |

A corresponding definition of the catalog table of Table B is as follows:

```
Struct Packed_Desc
{
    Char creator [128];
    Char name [128];
    Char type;
    Sint 16 flags;
}
```

Processing proceeds to step S470, where row upgrade module 520 upgrade the one or more rows to the specified version. In this example, in addition to a type of table/MQT ('T'), a type of view ('V') is supported in table B. When the catalog table is first created, the column of TYPE is added to the table and the packed descriptor, and initialized to 'T' for all rows in the catalog table. For example, when a base table or MQT is created, a new row is inserted into the catalog table and the 'TYPE' is 'T'. When the row for a view table is identified in Table B, the 'TYPE' is upgraded from the initialized 'T' to 'V'. To do this row upgrade, the database engine drive an implicit catalog row conversion module which make the specific rows (i.e. the last row in table B) pertaining to the view in the catalog table compatible to Vn+1 version and update their versions to Vn+1. This is a one-time operation which means, from next access to the view onwards, the version have already been updated to Vn+1 for the view in the catalog table (i.e. table B), so no conversion routine needs to be run. Thus, such upgrade adds very minimal overhead compared to millions of rows that a conventional upgrade database operation takes during the database upgrade. Further, only the concerned catalog table rows are modified and upgraded to Vn+1 version on demand.

Processing proceeds to step S475, where application request module 510 determines whether or not more requests from applications are received to access the catalog object. In this example, if "Yes" branch is selected, and process proceed back to step S465. For example, the application requests to change the type of MQT from "T" to "M," then the database engine determines if an entry (e.g. row) in the catalog table is for an MQT. Specifically, for every entry in the catalog table where TYPE="T," the database engine determines if this entry represents an MQT and then changes the "TYPE" to "M" or remains the "TYPE" to "T" based on the determination. Table C shows an example of the catalog table on which a row (in italics) is identified to change the "Type" from "T" to "M."

TABLE C an example of change the "Type" from "T" to "M" in the catalog table.

| Creator | Name | Type | Packed_Desc |
|---------|------|------|-------------|
| Jerry | Sales | T | <blob> |
| Jerry | Products | T | <blob> |
| Tom | Employee | T | <blob> |
| *Tom* | *Client* | *M* | *<blob>* |
| Jerry | Inventory | T | <blob> |
| Tom | managers | V | <blob> |

If "No" branch is selected from step S475, the process proceed to end. As can be seen, the applications themselves drive the selective database upgrade by using, for example, a system catalog conversion module, making the database highly available while upgrading. Eventually, the entire database is upgraded to Vn+1 as and when the system catalog objects are accessed the first time by any application. This brings down the database downtime to zero from applications perspective.

Some embodiments of the present invention may include one, or more, of the following features, characteristics and/or advantages: (i) database catalog is upgraded on-demand whenever one or more system catalogs are fetched as per the query requirements in new server version; (ii) no downtime is required from application point of view during system catalog upgrade; (iii) a new and efficient algorithm is applied to achieve system catalog upgrade while keeping servers highly available, which is beneficial in terms of performance, especially in production environments when hundreds of thousands of system catalog tables exist; (iv) disk space requirements for performing online database upgrades is optimized because significant space saving is achieved without double space requirement and without maintaining two separate copies of whole databases; (v) full database catalog upgrade is performed on-demand as and when needed per row basis without any restrictions imposed on conventional technologies; and/or (vi) a temporary compensation view is not needed to contain compensation logic to locate the database objects.

Some embodiments of the present invention are directed to upgrading a full database catalog on-demand on a per-row basis as-needed.

Some embodiments of the present invention are directed to on-demand upgrades whenever one or more system catalogs are fetched as per the query requirements in a new server version and perform system catalogs upgrade. There is no perceivable downtime from the application point of view during system catalog upgrade.

Some embodiments of the present invention apply an algorithm to achieve on-demand upgrades with no downtime, which will be beneficial in terms of performance. Further, the server will be highly available during the catalog upgrade. This is especially beneficial in production environments having hundreds of thousands of system catalog tables. For example, in-house DB2 LUW upgrades have proven that system catalog tables such as a single SYSIBM.SYSTABLES, having millions of rows, consume more than an hour to complete the upgrade to a new version, which is seen as downtime by the users.

According to some embodiments of the present invention, when a database instance is upgraded, the catalog tables remain at an older definition, for example, as version Vn. The catalog tables scope is on a per database basis, not on a per instance basis. So, when the query first accesses a system catalog table, e.g. SYSIBM.SYSTABLES, the database engine makes a request to a daemon thread (having DBADM authority to perform ALTERs on system objects) to wake up and perform a one-time ALTER operation to change the definition to Vn+1 so that the new table definition is in place, modifying only the concerned catalog tables rows to Vn+1 version on demand.

Some embodiments of the present invention are directed to a method to provide complete access to a database during an online upgrade.

Some embodiments of the present invention drive space savings to achieve the online database catalog upgrade. Savings in database data is realized because there is no need to maintain two separate copies of the full database, as is conventional.

Some embodiments of the present invention offer advantages with respect to total down time of the database engine during upgrades and optimization in disk space requirements for performing online upgrades.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
performing a selective upgrade of a database instance from a first version of a database to a second version of the database, wherein the selective upgrade enables the database to remain available to applications during database catalog upgrade, wherein the second version of the database is continually running and the selective upgrade causes the database instance to refer to the second version of the database, the selective upgrade does not modify, in the database instance, a reference of at least one catalog object of the first version of the database;
receiving a request from an application to access the at least one catalog object;
identifying a set of rows in the at least one catalog object of the first version of the database, the set of rows matching requirements of the request; and
modifying the set of rows in the at least one catalog object of the first version of the database to match a corresponding set of rows in a corresponding catalog object of the second version of the database; and
updating the set of rows in the at least one catalog object of the first version of the database to the second version of the database, wherein the upgrade of the database is run on a need-basis and enables applications to connect to the second version of the database while the upgrade of the first version of the database is performed.

2. The method of claim 1, wherein the at least one catalog object is a system catalog table.

3. The method of claim 1, wherein:
the at least one catalog object includes a first catalog object and a second catalog object, the request being to access the first catalog object; and
further comprising:
determining whether an additional request is received from the application to access the second catalog object.

4. The method of claim 1, wherein:
the at least one catalog object includes a first catalog object and a second catalog object, the request being to access the first catalog object; and
further comprising:
determining whether an additional request is received from another application to access the second catalog object.

5. The method of claim 1, wherein the identifying one or more rows from the catalog object includes searching every row of the catalog object.

6. The method of claim 1, wherein the modifying the set of rows includes performing an implicit catalog row conversion including:
making the set of rows compatible to the second version of the database; and
updating the set of rows to refer to the second version of the database instead of the first version of the database.

7. The method of claim 1, wherein the modifying the set of rows is performed while the database instance referring to the second version of the database is running.

8. A computer program product comprising a computer readable storage medium having stored a set of instructions stored therein which, when executed by a processor, causes the processor to upgrade a database by:
performing a selective upgrade of a database instance from a first version of a database to a second version of the database, wherein the selective upgrade enables the database to remain available to applications during database catalog upgrade, wherein the second version of the database is continually running and the selective upgrade causes the database instance to refer to the second version of the database, the selective upgrade does not modify, in the database instance, a reference of at least one catalog object of the first version of the database
receiving a request from an application to access the at least one catalog object;
identifying a set of rows in the at least one catalog object of the first version of the database, the set of rows matching requirements of the request; and
modifying the set of rows in the at least one catalog object of the first version of the database to match a corresponding set of rows in a corresponding catalog object of the second version of the database; and
updating the set of rows in the at least one catalog object of the first version of the database to the second version of the database, wherein the upgrade of the database is run on a need-basis and enables applications to connect to the second version of the database while the upgrade of the first version of the database is performed.

9. The computer program product of claim 8, wherein the at least one catalog object is a system catalog table.

10. The computer program product of claim 8, wherein:
the at least one catalog object includes a first catalog object and a second catalog object, the request being to access the first catalog object; and
further comprising:
determining whether an additional request is received from the application to access the second catalog object.

11. The computer program product of claim 8, wherein:
the at least one catalog object includes a first catalog object and a second catalog object, the request being to access the first catalog object; and
further comprising:
determining whether an additional request is received from another application to access the second catalog object.

12. The computer program product of claim 8, wherein the identifying one or more rows from the catalog object includes searching every row of the catalog object.

13. The computer program product of claim 8, wherein the modifying the set of rows includes performing an implicit catalog row conversion including:
making the set of rows compatible to the second version of the database; and
updating the set of rows to refer to the second version of the database instead of the first version of the database.

14. The computer program product of claim 8, wherein the modifying the set of rows is performed while the database instance referring to the second version of the database is running.

15. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to upgrade a database by:
performing a selective upgrade of a database instance from a first version of a database to a second version of the database, wherein the selective upgrade enables the database to remain available to applications during database catalog upgrade, wherein the second version of the database is continually running and the selective upgrade causes the database instance to refer to the second version of the database, the selective upgrade does not modify, in the database instance, a reference of at least one catalog object of the first version of the database receiving a request from an application to access the at least one catalog object;

identifying a set of rows in the at least one catalog object of the first version of the database, the set of rows matching requirements of the request; and modifying the set of rows in the at least one catalog object of the first version of the database to match a corresponding set of rows in a corresponding catalog object of the second version of the database; and updating the set of rows in the at least one catalog object of the first version of the database to the second version of the database, wherein the upgrade of the database is run on a need-basis and enables applications to connect to the second version of the database while the upgrade of the first version of the database is performed.

16. The computer system of claim 15, wherein the at least one catalog object is a system catalog table.

17. The computer system of claim 15, wherein:

the at least one catalog object includes a first catalog object and a second catalog object, the request being to access the first catalog object; and further comprising:

determining whether an additional request is received from the application to access the second catalog object.

18. The computer system of claim 15, wherein:

the at least one catalog object includes a first catalog object and a second catalog object, the request being to access the first catalog object; and further comprising:

determining whether an additional request is received from another application to access the second catalog object.

19. The computer system of claim 15, wherein the identifying one or more rows from the catalog object includes searching every row of the catalog object.

20. The computer system of claim 15, wherein the modifying the set of rows includes performing an implicit catalog row conversion including:

making the set of rows compatible to the second version of the database; and updating the set of rows to refer to the second version of the database instead of the first version of the database.

* * * * *